US 6,709,011 B2

(12) United States Patent
Neunzert et al.

(10) Patent No.: US 6,709,011 B2
(45) Date of Patent: Mar. 23, 2004

(54) LEAK DETECTION ENHANCING INSERT FOR AN AIRBAG INFLATOR ASSEMBLY

(75) Inventors: Martin R. Neunzert, Ogden, UT (US); Kerry C. Walker, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 10 days.

(21) Appl. No.: 09/790,433

(22) Filed: Feb. 21, 2001

(65) Prior Publication Data

US 2002/0113420 A1 Aug. 22, 2002

(51) Int. Cl.[7] .................................................. B60R 21/26
(52) U.S. Cl. ........................................ 280/736; 280/741
(58) Field of Search .............................. 280/736, 737, 280/740, 741; 102/202.12, 202.14, 530, 531

(56) References Cited

U.S. PATENT DOCUMENTS

| | | | | |
|---|---|---|---|---|
| 3,642,304 A | * | 2/1972 | Johnson et al. ............ 280/737 |
| 5,423,570 A | * | 6/1995 | Kort et al. ................ 102/530 |
| 5,441,302 A | * | 8/1995 | Johnson et al. ............... 222/3 |
| 5,480,185 A | * | 1/1996 | Lowe et al. ............... 280/740 |
| 5,529,335 A | * | 6/1996 | Bohmler ................. 280/728.1 |
| 5,558,366 A | * | 9/1996 | Fogle et al. ............... 102/530 |
| 5,588,676 A | * | 12/1996 | Clark et al. .................. 222/5 |
| 5,601,310 A | * | 2/1997 | Di Giacomo et al. ........... 222/3 |
| 5,622,381 A | * | 4/1997 | Mossi et al. ................ 102/202 |
| 5,630,618 A | * | 5/1997 | Hamilton et al. .......... 280/736 |
| 5,664,803 A | * | 9/1997 | Skånberg et al. ........... 102/531 |
| 5,762,370 A | * | 6/1998 | Lindsey et al. ............. 102/530 |
| 5,779,266 A | | 7/1998 | Moore et al. |
| 5,803,493 A | * | 9/1998 | Paxton et al. .............. 280/737 |
| 5,854,441 A | * | 12/1998 | Metzger ................... 102/531 |
| 5,884,938 A | | 3/1999 | Rink et al. |
| 5,890,735 A | * | 4/1999 | Smith ...................... 280/737 |
| 5,924,728 A | * | 7/1999 | Evans et al. ............... 280/741 |
| 5,944,343 A | * | 8/1999 | Vitek et al. ............... 280/736 |
| 5,979,936 A | * | 11/1999 | Moore et al. .............. 280/736 |
| 6,019,389 A | * | 2/2000 | Burgi et al. ............... 280/736 |
| 6,056,319 A | * | 5/2000 | Ruckdeschel et al. ....... 280/741 |
| 6,073,963 A | * | 6/2000 | Hamilton et al. ........ 102/202.14 |
| 6,120,058 A | | 9/2000 | Mangum et al. |
| 6,168,202 B1 | * | 1/2001 | Stevens ....................... 280/737 |
| 6,170,868 B1 | | 1/2001 | Butt et al. |
| 6,183,008 B1 | * | 2/2001 | Prokopec et al. ........... 102/530 |
| 6,189,922 B1 | * | 2/2001 | Parks et al. ................ 280/735 |
| 6,224,097 B1 | * | 5/2001 | Lewis ....................... 102/531 |
| 6,227,565 B1 | * | 5/2001 | McFarland et al. .......... 102/531 |
| 6,234,524 B1 | * | 5/2001 | Patrickson et al. ....... 102/202.1 |
| 6,244,623 B1 | * | 6/2001 | Moore et al. ................ 280/737 |
| 6,295,935 B1 | * | 10/2001 | Swann et al. ........... 102/202.14 |
| 6,298,789 B1 | * | 10/2001 | Ericsson et al. ............ 102/530 |
| 6,314,888 B1 | * | 11/2001 | Muller et al. ............... 102/530 |
| 6,314,889 B1 | * | 11/2001 | Smith ....................... 102/530 |
| 6,338,500 B1 | * | 1/2002 | Perotto .................... 102/202.5 |
| 6,382,668 B1 | * | 5/2002 | Goetz ........................ 280/737 |

* cited by examiner

Primary Examiner—Paul N. Dickson
Assistant Examiner—Deanna Draper
(74) Attorney, Agent, or Firm—James D. Erickson; Sally J. Brown

(57) ABSTRACT

An inflator is provided that can reduce the occurrence of virtual and masked leaks in inflator testing. The inflator may have an outer wall surrounding a main internal compartment containing compressed inflation gases. Additionally, the inflator may have a pyrotechnic assembly containing a generant, or pyrotechnic material, and an initiator configured to ignite the pyrotechnic material upon receipt of an electric signal from a vehicle's electrical system. The initiator may be separated from the pyrotechnic material, and from the compressed gases, by a pressure dome that effectively creates a cavity around the initiator. The initiator may be accessible to outside contact through an opening in the outer wall. An insert may be positioned around the initiator to control flows of gas leaving the cavity through the opening. Thus, during testing, residual gases within the cavity are able to escape the inflator within a predictable time period, so that the inflator can reliably be checked for gases exiting the main internal compartment. The insert may have a porous design so that gases escape from the cavity at a controlled rate during testing, but are unable to escape in any destructive manner during ignition of the pyrotechnic material.

19 Claims, 2 Drawing Sheets

LEAK DETECTION ENHANCING INSERT FOR AN AIRBAG INFLATOR ASSEMBLY

BACKGROUND OF THE INVENTION

1. The Field of the Invention

The present invention relates to inflatable safety restraint systems for vehicles. More specifically, the present invention relates to a novel apparatus and method for improving leak detection in an inflator for an airbag assembly.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the release of pressurized gases. The expanding gases fill the airbags, which immediately inflate in front of the driver and passenger to protect them from impact against the steering and dashboard components. Side impact airbags have also been developed in response to the need for similar protection from impacts in a lateral direction, or against the side of the vehicle.

The pressurized gas typically originates within a pressure vessel called an "inflator." Inflators provide the pressurized gas in many different ways. Some inflators, termed "stored gas inflators," simply store the gas in a high-pressure state, and open to release the gas during impact. "Pyrotechnic" inflators, by contrast, do not store gas; rather, they contain generants that, upon ignition, react to produce the gas. "Hybrid" inflators utilize compressed gas in combination with pyrotechnics to produce the inflation gas. In some instances, the pyrotechnic can also serve to open the inflator to permit the gases to escape.

Each type of inflator must generally be sealed. In the case of compressed gas inflators, it is necessary to keep the compressed gas from escaping. For pyrotechnic and hybrid inflators, the generants must typically be sealed off from ambient air to avoid degradation from moisture and other contaminants. Inflators utilizing solid generants are typically activated by an initiator, which converts an electric impulse to heat in order to ignite the charge.

Such initiators often have electrical contacts, or prongs, protruding from the inflator to receive the electric impulse from wiring or a socket within the vehicle. Consequently, an opening must be provided in the wall of the inflator so that the prongs can extend outside the pressurized compartment (s) of the inflator. In order to ensure that the generant remains viable, a membrane, or pressure dome, may be positioned around the initiator to separate the generant from the initiator and whatever ambient air may be present in the vicinity of the initiator. The pressure dome is designed to disintegrate upon activation of the initiator, thereby permitting the heat of the initiator to reach the generant.

Upon disintegration of the pressure dome, the cavity is then exposed to the gases created by the reaction of the generant. Directly after ignition of the generant, these gases are hot and highly-pressurized, especially in the vicinity of the initiator, where the generant has reacted. If these gases exit the inflator through the opening at such an elevated temperature and pressure, they can potentially damage the vehicle or injure vehicle occupants. Consequently, it is desirable to encase the initiator in some type of insert that effectively plugs the opening, while still permitting passage of the initiator through the opening.

However, it is difficult to form a reliable seal between the inflator and the insert, and still more difficult to effectively test whether or not the insert has effectively sealed the opening. Thus, the initiator is located inside a cavity that may or may not be open to ambient air. Such an arrangement, in which there is a low-pressure cavity within the initiator, can cause a number of problems, particularly with leak detection.

Typically, inflators are checked for leaks prior to installation in a vehicle. Leak detection may be accomplished by, first, filling the inflator with the appropriate mixture of gases. Often, a small percentage of trace material, consisting of an easily detected gas, is added. For example, helium is often added to inflators because helium occurs only in trace amounts in nature, and has a unique atomic weight that is easily detectable through mass spectrometry or other known methods. Radioactive isotopes may also be effectively used for trace materials. The inflator is then placed in a testing chamber, and the testing chamber is evacuated and then sealed. After a certain period of time, the amount of the trace material within the chamber is measured and recorded. If more than a trace amount of the gas is detected, the inflator is rejected and typically scrapped.

However, when there is a cavity within the inflator, that may or may not be sealed from the testing chamber, it is difficult to recognize whether detected leaks are from the main pressurized internal compartment of the inflator, which must remain sealed, or from the cavity, for which sealing from ambient air is not critical. More specifically, "virtual leaks" and "masked leaks" may be caused by such a cavity.

A "virtual leak" exists when gases remaining in the cavity during the evacuation of the testing chamber emerge after evacuation. Often the processes of assembling and filling the inflator leaves a certain amount of residual gas, including the trace material, within the cavity. Alternatively, these gases may be temporarily absorbed by the materials of the cavity, and may remain present until the cavity is subjected to the low pressure of the testing chamber.

Such a leak is a "virtual leak" because there is no real leak in the main internal compartment of the inflator, but the gas sensing equipment registers the presence of the gases from the cavity. Since it is difficult to detect exactly which part of the inflator is the source of gases detected in the testing chamber without comprehensive and time-consuming tests, it is often assumed that the inflator is defective if any significant amount of the trace material is present in the chamber after evacuation. As a result, virtual leaks result in the scrapping of many perfectly usable inflators. The lower yield of the inflator production process causes inflators, and airbag systems in general, to be more expensive, and therefore less widely available as lifesaving devices.

A "masked leak" occurs when there is an actual leak in the main internal compartment of the inflator, for example, in the pressure dome, but the leak is not detected. Gas leaks from the main internal compartment, which is at comparatively high pressure, into the cavity, which is at a lower pressure. However, the insert acts to keep the gases from escaping the cavity at a significant rate. Thus, after evacuation of the testing chamber, no significant amount of the trace material is registered.

Such a leak is potentially dangerous because a real leak exists in the inflator, and over the operating life of the inflator, which may be as much as 15 years, the compressed gas will leak out of the inflator. Without the compressed gas, it is likely that the airbag cushion will not inflate enough to effect occupants of the vehicle. It is also possible that the generant will become contaminated or moistened by exposure to ambient air. Thus, the generant may misfire, causing insufficient inflation of the cushion and potential danger to occupants of the vehicle. The leak is effectively "masked" because the insert does not permit the leaking gases to escape at a detectable rate. Even though the inflator is defective, it passes inspection and is installed in a vehicle.

Virtual leaks and masked leaks generally can be traced to the same root cause: the unpredictability of the seal provided by the insert. In the case of a virtual leak, the insert permits comparatively free flow of gases out of the cavity, and in the case of a masked leak, the insert seals off the cavity enough to prevent detection of the leak. Both problems are a result of the fact that the integrity (gastight sealing effectiveness) of the insert is unknown and subject to wide variation.

Unfortunately, known methods of allowing for fluid passage through an obstacle at a limited flow rate are generally unusable in the presence of gases at combustion temperatures and pressures. For example, if a comparatively large hole is provided in the insert, the result is that a "blowby path" exists in the inflator. Rather than entering the cushion, as intended, the combustion and compressed gases are permitted to blow through the insert at a high flow rate. Thus, the cushion is not sufficiently inflated, and a dangerous buildup of hot, pressurized gas is created outside the inflator, within the vehicle.

If, instead of a large hole, one or more smaller holes are formed in the insert, a "ballistic leak" is likely to occur. Ballistic leaking occurs when leaking gases are at a high enough temperature and pressure to erode the inflator material (typically metal), and even burn into the interior of the vehicle. Tight flow restrictions, such as small holes, multiply the speed of exiting gases so that a jet of hot, high pressure gas exits the hole.

Since erosion of a solid material by a fluid flow is generally proportional to the speed of the fluid, the rapidly travelling gases erode the walls of a small hole at a high rate of speed. As a result, hot pieces of the inflator insert material are entrained in the gas flow, thereby increasing the cutting force of the jet. The jet can cut through parts of the vehicle interior, or even cause a fire in the vehicle. Ballistic leaks are thus highly undesirable because they have the potential to damage the vehicle and injure occupants.

Consequently, there is a need, unfulfilled by the prior art, for an inflator insert that permits the passage of gas at a predictable rate. More specifically, the insert should preferably permit gases at low pressure to flow through the insert over time, while limiting the speed at which high pressure gases are able to escape. Preferably, the insert should not contain flow restrictions that tend to channel pressurized gases into a narrow passageway, so that ballistic leaking does not occur.

Additionally, such an insert should preferably be structurally strong, so that it can tolerate the stresses induced by installation within the inflator and operation of the inflator. Furthermore, the insert should preferably be inexpensive, easy to manufacture, and simple to install. Yet further, the insert may beneficially be made compatible with existing initiator and inflator designs.

BRIEF SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an apparatus and method for plugging an opening of an inflator, such that gas is permitted to flow through the insert at a predictable and controlled flow rate.

To achieve the foregoing objective, and in accordance with the invention as embodied and broadly described herein in the preferred embodiment, an inflator comprising a novel insert is provided. According to certain embodiments, the inflator contains compressed gas in a main internal compartment of the inflator; an outer wall of the inflator is configured as a pressure vessel to keep the compressed gas from exiting the main internal compartment.

The inflator may also contain a pyrotechnic assembly in which a measured quantity of generant, or pyrotechnic material, is stored. The pyrotechnic assembly may be seated within an opening in the outer wall of the inflator. Preferably, the pyrotechnic assembly provides a path from the pyrotechnic material to the outside of the inflator so that the pyrotechnic material can be ignited by an electrical impulse originating outside the inflator.

The pyrotechnic assembly may have a housing designed to contain the various components of the assembly. More specifically, the housing may have a larger compartment containing the pyrotechnic material. The larger compartment may separated from the main internal compartment by a cap seated within the housing. In certain embodiments, the cap need not provide a seal against the compressed gas, but must simply keep the pyrotechnic material from exiting the pyrotechnic assembly to enter the main internal compartment. However, the pyrotechnic material is preferably kept isolated from the ambient air outside the inflator by a membrane, or pressure dome, abutting the pyrotechnic material, opposite the cap.

The pressure dome effectively forms a cavity within the inflator; the cavity is kept separate from the compressed gases of the main internal compartment, and the pyrotechnic material, by the pressure dome. Thus, the cavity may be left open to ambient air without losing the compressed gas in the main internal compartment or subjecting the pyrotechnic material to contaminants. An initiator may then be housed in the cavity, with an ignition head positioned close to the pressure dome to ignite the pyrotechnic material through the pressure dome.

Upon ignition of the inflator, the pressure dome disintegrates and the hot gases enter the cavity at high speed. For the reasons described above, these gases are not allowed to flow past the initiator and out of the inflator through the opening. Rather, an insert is preferably provided to plug the bore of the housing without interfering with operation of the initiator. Thus, the insert may have an annular configuration designed to encircle the initiator. Preferably, the insert is made to relatively tightly engage the initiator, as well as the bore of the pyrotechnic assembly housing, to eliminate any blowby path.

As described above, it is somewhat difficult to form a reliable seal between the insert and the initiator, and between the insert and the bore of the pyrotechnic housing. Thus, in order to avoid the problems described above in connection with leak detection, the insert is preferably made to permit passage of gas through the insert, but only at a limited flow rate. Thus, both residual trace gases and gases leaking from the main internal compartment, through the pressure dome, may escape through the insert for detection. However, no effective blowby path exists because the reaction of the pyrotechnic material exhausts itself before a significant amount of gas is able to escape through the insert. In order to avoid ballistic leaking, the insert preferably operates without any small, concentrated passageways that may tend to create a pressurized gas jet exiting the inflator.

In order to provide such controlled passage of gases, the insert may, in certain configurations, have a porous construction. Porous materials typically have a grainy texture, with small interstices between the grains, through which gases can flow. However, no straight flow path exists so gas passage is impeded and slowed by the porous structure. As a result, no blowby path is formed. Additionally, no ballistic jet is able to form because all paths through the porous material are more or less equally impeded, so flows do not concentrate in a single path, and all gas flows are slowed by the grainy texture.

Such a porous insert may be provided in a variety of ways. For example, certain materials, such as woods, are naturally porous. However, the insert of the present invention is preferably able to withstand the stresses of installation and the impact stresses caused by the ignition of the pyrotechnic material. Thus, it may be desirable to use a structurally stronger material, such as a metal.

Since most metals have a naturally non-porous structure, the material chosen is preferably processed to provide such a texture. For example, a metal powder of a suitable consistency may be provided through the use of a plasma spray. The metal powder may then be compressed into the proper shape, for example, by applying high pressure at ambient temperature to press the powder into a mold to form a compacted mass. Then, the compacted mass may be sintered, or essentially baked in a high-temperature oven, to fuse the powder grains and create a solid structure. The resulting insert possesses a porous structure and yet has a high degree of structural strength.

The insert may be installed, and the inflator may be filled with compressed gas, if it is of a hybrid type. Alternatively, the inflator may simply be a pyrotechnic type in which no significant amount of compressed gas is stored. In either case, the trace gas may be added for detection purposes. Then, the inflator may be tested to determine whether or not the pressure dome effectively seals the main internal compartment from the ambient atmosphere.

Testing may be accomplished by first placing the inflator into a testing chamber. Then, the testing chamber may be substantially evacuated or brought to a very low pressure. Once the chamber obtains the desired pressure, the inflator may simply be allowed to sit in the low-pressure chamber for a period of time so that any residual gases in the cavity can bleed out through the insert. These gases may then be removed through further evacuation of the chamber. During the bleed-out process, the level of the trace gas within the testing chamber may be continually monitored, if desired.

After the bleed-out period has elapsed, the chamber may be sealed off so that all additional gases exiting the inflator remain in the chamber. The amount of the trace gas may then be detected and recorded. If more than a threshold quantity of the trace gas is detected, the inflator may then be set aside for reworking, scrapping, or discarding.

Through operation of the insert, the results of the leak detection test are made much more reliable because the residual gases from the cavity have already bled out through the insert, prior to detection. Thus, any trace gases detected after the bleed-out must originate in the main internal compartment of the inflator. Consequently, leaks in the pressure dome cannot be masked, and residual trace gases in the cavity are cleared out so that they are unable to cause a virtual leak, or false leak reading.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
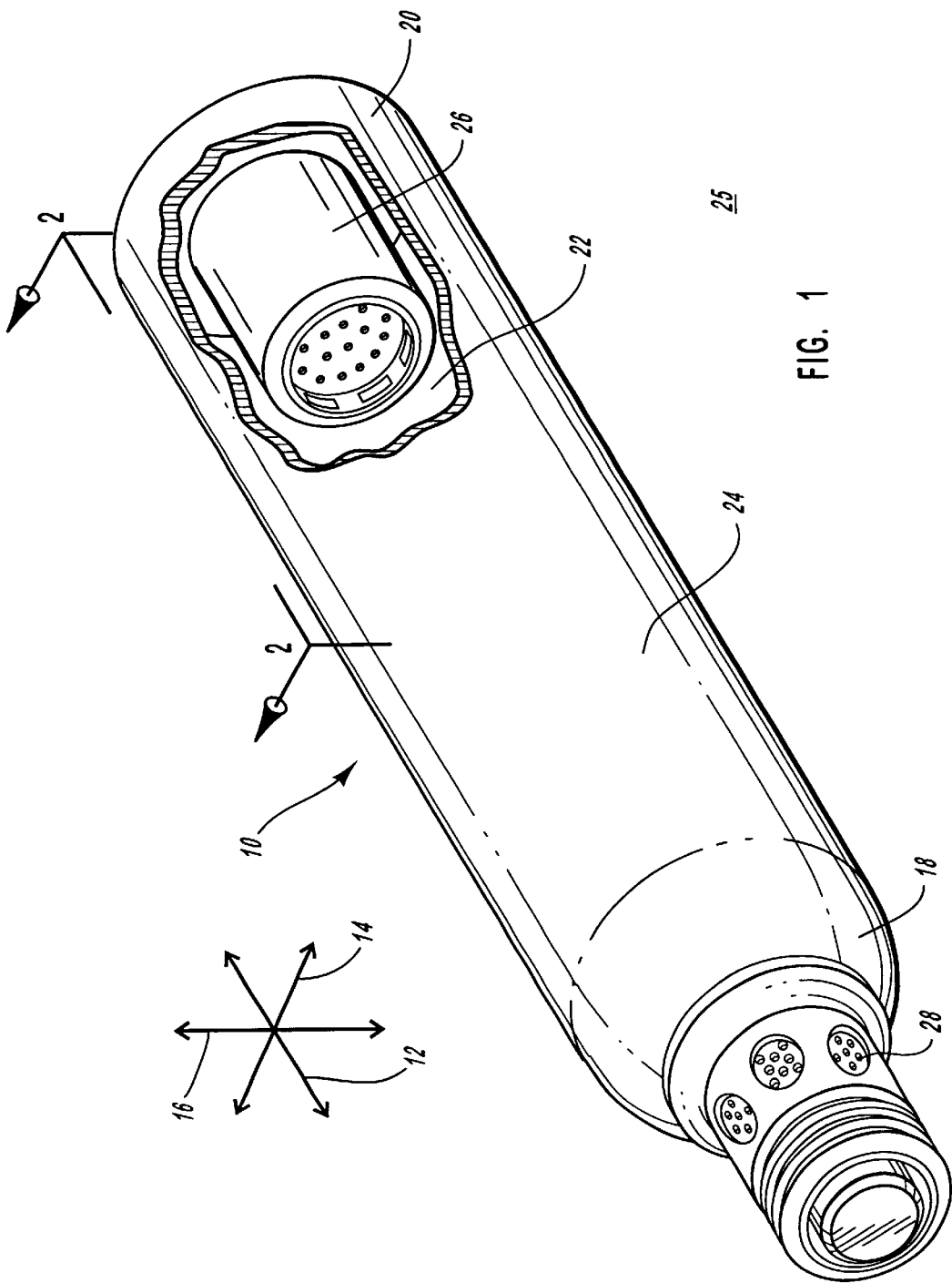
FIG. 1 is a cutaway, perspective view of one embodiment of an inflator according to the present invention.
Figure 2:
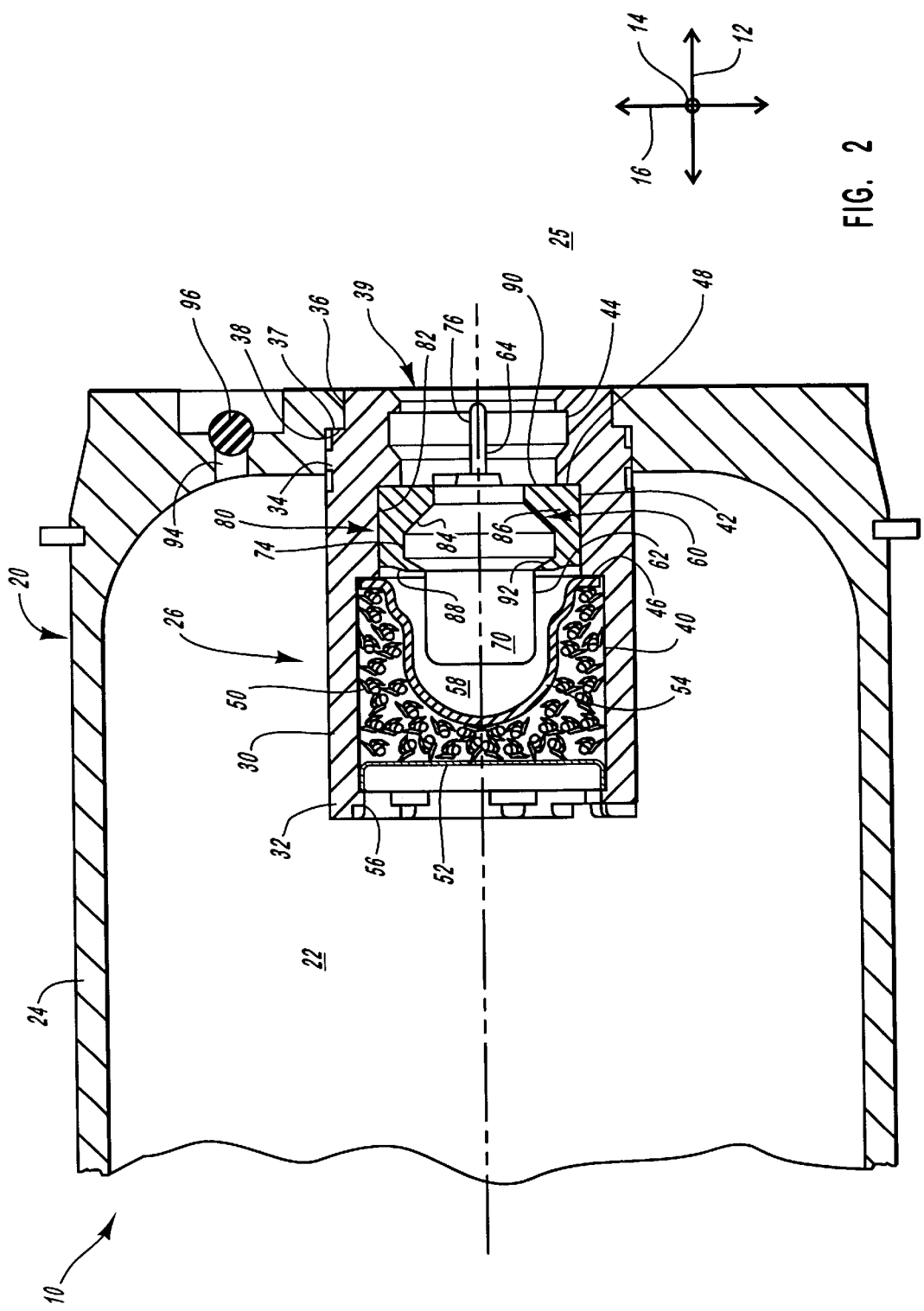
FIG. 2 is a side elevation, sectioned view of the inflator of FIG. 1, with its associated pyrotechnic assembly.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of presently preferred embodiments of the invention.

Because of the problems described above, the design of inflators containing internal cavities poses a certain dilemma. Gas flowing across a given pressure gradient tends to flow at a mass flow rate roughly proportional to the size of the passage through which it flows, and the magnitude of the pressure gradient. On the one hand, it is desirable to provide a narrow passage to slow the flow of gases out of the cavity. If a larger cavity is provided, gas is permitted to flow freely from the cavity upon ignition of the pyrotechnic and the result is that a blowby path is created. As a result, large amounts of gas emerge from the wrong part of the inflator.

On the other hand, if a smaller passageway, such as a capillary tube, is used, gases under high pressure concentrate to travel through the smaller passageway at high speed. The result is the creation of a ballistic leak. The high-speed gases flowing through the passageway cause damage to the inflator and the vehicle compartment that houses the inflator, and potentially even cause a fire in the vehicle.

The problem of erosion, which was also mentioned above, is another issue that must be dealt with by the invention. Any fluid flowing along a solid surface will tend to cause erosion. Erosion is generally the wearing away of the solid material; grains of the solid material become entrained and carried away by the fluid stream. In the context of pyrotechnics, erosion is accelerated by the pressure, velocity, and temperature of the exhaust gases. The more rapidly the gases flow, the more solid material erodes away. Erosion of the inflator material is hazardous because it increases the abrasive content of the gas flow, making it more likely to cause mechanical damage, fires, or even poison occupants of the vehicle.

The present invention solves the problem described above by providing a unique flow path for gas exiting the cavity. The flow path avoids the disadvantages inherent in both larger passageways and smaller passageways by providing small-scale diffusion of the gas flow. Numerous small-scale obstacles are provided in the flow path; as a result, the gases are unable to flow through the flow path at a high mass flow rate, even though the combined open cross-sectional area between the flow paths may be somewhat large. Additionally, no single straight, unimpeded passageway exists in the flow path, so the gases do not concentrate to form a high-speed column. No ballistic jet is formed, and erosion is reduced.

Erosion is further reduced by the fact that the flow path has a structure that is generally small-scale self-reinforcing. In effect, each grain within the flow path is supported in all directions by neighboring grains. Since there is no open pathway, grains of material are generally unable to free themselves to move with the gas. Even grains that become dislodged are rapidly arrested by other grains downstream. Thus, very little granular material is able to exit the inflator to cause damage or injury.

According to certain embodiments of the invention, the small-scale diffusing and small-scale self-reinforcing flow path described above may be formed by a porous material positioned to form a boundary of the cavity. The porous structure of the insert effectively regulates the flow of gas out of the cavity, so that residual gases can be easily purged from the cavity to enhance the reliability of the leak detection process. The flow path is provided without creating a blowby path or ballistic leak during deployment of the inflator. The concepts outlined above, and their application to one example of an inflator incorporating the principles of the invention, will be described in further detail below.

Referring to FIG. 1, one embodiment of an inflator 10 incorporating a small-scale diffusing and small-scale self-reinforcing flow path is depicted. The inflator may have a longitudinal direction 12, parallel to an axis of rotational symmetry of the inflator 10, as well as a lateral direction 14 and a transverse direction 16, as depicted. The inflator 10 may also have a first end 18 and a second end 20.

The inflator 10 has a hollow structure, with a main internal compartment 22 surrounded by an outer wall 24 configured to seal the internal compartment 22 against leakage into or contamination from air of the ambient region 25 outside the inflator 10. The outer wall 24 is preferably constructed of a comparatively high strength, yet comparatively ductile material, such as a mild steel or aluminum. The capped, cylindrical shape of the outer wall 24, as depicted in FIG. 1, is beneficial because tensile stresses are distributed comparatively evenly, without stress concentrations. However, the outer wall 24 may be constructed in any other shape, to meet space and weight limitations, if desired. The main internal compartment 22 comprises the majority of the volume within the inflator 10 in which inflation gases may be stored in compressed form.

The inflator 10 may include a pyrotechnic assembly 26 positioned within the outer wall 24. The pyrotechnic assembly 26 contains a pyrotechnic which may take the form of a solid pyrotechnic material. The pyrotechnic assembly 26 may be activated by an electric charge conveyed into the pyrotechnic assembly 26 by wiring (not shown) connected to the electrical system of the vehicle. The pyrotechnic assembly 26 depicted in FIG. 1 is positioned at the second end 20 of the inflator 10. If desired, the pyrotechnic assembly 26 may be utilized in tandem with a second pyrotechnic assembly (not shown) positioned within the first end 18. Thus, the pyrotechnic assembly 26 may form a first, and primary, stage for creation of inflation gases, or may simply operate as a second, auxiliary stage used to provide supplemental fill pressure for the airbag cushions.

When the inflator 10 deploys, the pyrotechnic material of the pyrotechnic assembly 26 ignites to release additional gases and simultaneously heat the existing compressed inflation gas in the main internal compartment 22. The inflator 10 may simultaneously be opened proximate the first end 18 to permit the expanding gases to flow out of an outlet 28 in the first end and into a cushion (not shown). The opening 28 may have some type of diffuser arrangement to avoid expelling a jet of concentrated, heated gas. If desired, a conduit may be provided to channel gases from the outlet 28 of the inflator 10 to an inlet of the cushion.

Referring to FIG. 2, a sectioned view of the second end 20 of the inflator 10 is depicted, as viewed from one side. The pyrotechnic assembly 26 preferably comprises a housing 30 having a first end 32 oriented toward the first end 18 of the inflator 10 and a second end 34 opposite the first end 32. The second end 34 is preferably seated within an opening 36 in the outer wall 24 of the inflator 10. The housing 30 may be constructed of a wide variety of materials, such as metals, composites, elastomers, polymers, ceramics, or mixtures thereof. However, relatively strong metals, such as steel and aluminum are preferable.

As depicted in FIG. 2, the housing 30 of the pyrotechnic assembly 26 has a substantially tubular shape and the opening 36 has a circular shape configured to receive the second end 34 of the housing. However, the pyrotechnic assembly 26 need not be tubular, but may have any straight-sided, curved, or mixed shape. The opening 36 similarly need not be circular, but may have any rounded, flat-sided, or mixed shape.

Preferably, the housing 30 and the opening 36 fit tightly together so that the compressed gas cannot flow around the housing 30 and through the opening 36 to escape the inflator 10. The housing 30 may, for example, be installed within the opening 36 by an interference fit, or a "press-fit." The opening 36 may be made with a slight taper so that the diameter of the opening 36 is greater inside the outer wall 24. Similarly, the second end 34 of the housing 30 may have matching taper so that the diameter of the second end 34 is greater toward the middle of the housing 30. The housing 30 may then be pressed into the opening 36 until radial pressure builds in the outer wall 24 surrounding the opening 36 inward against the second end 34 to keep the housing 30 in place.

The housing 30 may also be affixed to the outer wall 24 proximate the opening 36 in a wide variety of ways, including thermal, frictional, and radio frequency welding, chemical and adhesive bonding, mechanical fastening, or the like. In any case, the housing 30 is preferably located substantially within the inflator 10 so that most of the housing 30 is inside the outer wall 24.

The pressure differential between the compressed gas of the main internal compartment 22 and the air of the ambient region 25 tends to force the housing 30 out of the inflator 10 through the opening 36. During deployment of the inflator 10 the combustion inside the inflator 10 increases the pressure differential even further. The press-fit arrangement described above helps to resist motion of the pyrotechnic assembly 26 through the opening 36 because the radial pressure gripping the housing 30 of the pyrotechnic assembly 26 increases as the housing 30 moves further into the opening 36. The opening 36 may also have an annular shelf 37 configured to abut a similar annular shelf 38 on the second end 34 of the housing so that motion of the pyrotechnic assembly 26 through the opening 36 is yet more firmly prevented.

The housing 30 is preferably hollow, so that a bore 39 extends clear through the housing 30 in the longitudinal direction 12. Near the first end 32, the bore 39 may be enlarged to form a larger compartment 40. The bore 39 may also have a smaller compartment 42 between the first and second ends 32, 34, and an attachment portion 44 near the second end 34. An annular shelf 46 may be formed in the bore 39 between the larger and smaller compartments 40, 42. Similarly, an annular shelf 48 may be formed in the bore 39 between the smaller compartment 42 and the attachment portion 44. The attachment portion 44 is preferably shaped to receive an electrical connector, such as a plug (not shown) connected to the electrical system of the vehicle, into permanent engagement.

In FIG. 2, the bore 39 is depicted with a circular shape in which only the diameter of the circle changes along the length of the bore 39. However, if desired, the bore 39 may have an otherwise curved, flat-sided, or rounded shape. The shape of the bore 39 need not be uniform along the length of the bore 39, but may be altered to suit the structures contained within the larger compartment 40, the smaller compartment 42, and the attachment portion The larger compartment 40 may contain a pyrotechnic material 50 formed of a pyrotechnic substance. The pyrotechnic material 50 may be a liquid or gas, or may take the form of a solid, such as the powder arrangement depicted in FIG. 2. Preferably, the pyrotechnic material 50 is stable enough that no combustion occurs under the normal vibrations, acceleration, and deceleration associated with operation of the vehicle. The pyrotechnic material 50 may be activated by a primer or initiator ignition.

The pyrotechnic material 50 may be kept within the larger compartment 40 by a cap 52 and a membrane 54. The cap 52 may be positioned outward of the pyrotechnic material 50 and may operate to keep the pyrotechnic material 50 from exiting the pyrotechnic assembly 26 into the main internal compartment 22. The first end 32 of the housing 30 may have a plurality of inward-protruding shelves 56 positioned to keep the cap 52 in position. The cap 52 may, for example, take the form of a stamped piece of sheet metal.

The cap 52 may be inserted prior to formation of the shelves 56 into the larger compartment 40. Then, in a process called "staking," a star-shaped die (not shown) may be pressed into the bore 39 so that the points of the star-shaped die press into the housing 30 in the longitudinal direction 12 to fold the material of the housing 30 inward, thereby creating the shelves 56 to retain the cap 52. Alternatively, the cap 52 may be retained within the housing 30 in a wide variety of different ways. For example, a ridge may be formed in place of the shelves 56 prior to insertion of the cap 32, and the edges of the cap 32 may be bent outward after insertion to ensure that the cap 32 cannot be pulled longitudinally, past the ridge.

Preferably, the cap 52 does not produce a gastight seal between the larger compartment 40 of the housing 30 and the main internal compartment 22 of the inflator 10. If the cap 52 is sealed a pressure differential between the main internal compartment 22 and the larger compartment 40 may be created tending to dislodge the cap 52. Thus, a vent hole (not shown) may be formed in the cap 52 to permit the gas pressures in the main internal compartment 22 and the larger compartment 40 to equalize.

The membrane 54 may have a domed shape extending into the larger compartment 40 to provide a rounded internal cavity 58 within the larger compartment 40. Thus, the membrane 54 may be configured as a pressure dome 54. The pressure dome 54 serves to keep the pyrotechnic material 50 from entering the smaller compartment 42 of the pyrotechnic assembly 26. Additionally, the pressure dome 54 preferably substantially seals the smaller compartment 42 from the larger compartment 40, so that the compressed gas, which has access to the larger compartment 40 through the cap 52, is unable to escape into the smaller compartment 42. The substantial seal provided by the pressure dome 54 must be sufficient to ensure that an airbag cushion can be inflated after the inflator 10 has been in use for the full life of the vehicle, which may be 15 or 20 years.

The pressure dome 54 may abut the annular shelf 46 such that the pressure dome 54 cannot be forced into the smaller compartment 42. The pressure dome 54 may be affixed to the annular shelf 46 through a method such as thermal, frictional, or radio frequency welding, adhesive or chemical bonding, or the like. If desired, the pressure dome 54 may also be sized to engage the bore 39 proximate the annular shelf 46 such that the bore 39 grips the pressure dome 54 to hold it in place.

The cavity 58 is simply a volume within the outer wall 24 of the inflator 10 that is sealed from fluid communication with the main internal compartment 22. Thus, the cavity 58 need not have a domed or hemispherical boundary, but may have any shape configured to contain at least a portion of a penetrating member 60. The penetrating member 60 includes any member that extends through the outer wall 24, for example, through the opening 36. It may be desirable to position one or more of a wide variety of penetrating members 60, such as activating members, sensors, and the like within the inflator 10 in such a fashion that they are accessible from outside the inflator 10. According to selected embodiments, the penetrating member 60 takes the form of an initiator 60 designed to ignite the pyrotechnic material 50.

An initiator 60 may be provided to ignite the pyrotechnic material 50. The initiator 60 may have a first end 62, positioned within the cavity 58 in the larger compartment 40, and may extend through the smaller compartment 42 to a second end 64 positioned in the attachment portion 44. The initiator 60 is preferably configured to receive an electrical signal and produce a quantity of high-pressure, high-temperature gas. The initiator 60 may have an ignition head 70, located within the cavity 58. The ignition head 70 may, for example, contain a small amount of generant (not shown), as well as a resistor (not shown) configured to radiate heat to flash ignite the generant when the current through the resistor reaches a threshold level. The initiator 60 may also take many other forms within the scope of the present invention.

The membrane 54 need not take the form of the pressure dome 54 depicted in FIG. 2, but may have any shape selected to provide a seal between the pyrotechnic material 50 and the initiator 60. Thus, the membrane 54 may have one or more flat surfaces or may include a wide variety of different curved surfaces. However, the domed shape, oriented as depicted in FIG. 2, is advantageous because the higher pressure of the main internal compartment 22 tends to compress the material of the pressure dome 54 inward substantially uniformly. Such uniform compressive pressure does not tend to rupture the pressure dome 54, but rather tends to keep cracks from forming. Additionally, the domed shape keeps a comparatively large amount of the pyrotechnic material 50 in the vicinity of the initiator 60 to promote a relatively uniform, complete ignition of the pyrotechnic material 50.

The pressure dome 54 may have a material and thickness selected to form a gastight seal while still permitting the pressure dome 54 to rupture when the initiator 60 deploys. Thus, the pressure dome 54 may be stamped or otherwise formed from a thin sheet of steel to create the dome shape. Alternatively, the pressure dome 54 need not rupture but may be dislodged by the deployment of the initiator 60 to permit the flow of hot gases from the cavity 58 into the larger compartment 40, or may simply conduct heat from the explosion of the initiator 60 directly to the pyrotechnic material 50 to ignite the pyrotechnic material 50.

Preferably, the initiator 60 is positioned such that it can be connected and activated from outside the inflator 10 through the opening 36. More specifically, the initiator 60 may have an outer edge 74 positioned generally within the smaller compartment 42 and electrical contacts 76 protruding outward through the attachment portion 44. The electrical contacts 76 may, for example, comprise a pair of metal prongs configured to mate with a plug (not shown) to be inserted into the attachment portion 44 of the bore 39. The attachment portion 44 may be shaped to receive the plug in a permanent fashion so that there will be little danger that the plug will be tampered with or otherwise removed from the inflator 10 after installation in the vehicle. The initiator 60 may generally be housed within a plastic or a fiber-reinforced, composite material.

Preferably, the initiator 60 is seated within an insert 80, which is, in turn, seated in the smaller compartment 42. The insert 80 may have an outer rim 82 shaped to engage the smaller compartment 42, an orifice 84 shaped to hold the initiator 60, and a substantially porous mass 86 forming the interior of the insert 80 between the outer rim 82 and the orifice 84. Additionally, the insert 80 may have a first annular face 88 oriented into the cavity 58, and a second annular face 90 exposed to the ambient region 25.

The "substantially porous" mass refers to a mass that has a generally porous structure without open passageways of any significant size. Thus, the substantially porous mass 86 need not have a precisely uniform porous structure, but may comprise a variety of pore sizes, with some portions of solid, non-porous material. Thus, the substantially porous mass 86 has a gas-permeability that limits, but does not stop, the flow of gas through the insert 80. The engagement of the insert 80 with the outer rim 82 and the smaller compartment 42 of the bore 39 is preferably tight enough that no significant amount of gas is able to pass between the insert 80 and the outer rim 82, or between the insert 80 and the housing 30.

The insert 80 need not have an annular shape, but may take any form suitable for permitting a restricted flow of gas out of the cavity 58, around the initiator 60, without creating a blowby path or ballistic leak. Thus, the outer rim 82 of the insert 80 need not be circular, but may be otherwise shaped, if necessary, to engage a non-circular embodiment of the bore 39 in sealing fashion. Similarly, the orifice 84 need not be circular or centrally located in the insert 80, but may be offset and/or differently shaped to receive an offset or non-circular initiator 60.

The insert 80 may also have retention flaps 92 formed in the first annular face 88 to hold the initiator 60 in place. The retention flaps 92 may be formed in an open position and subsequently closed to provide the interlocked configuration depicted in FIG. 2. Thus, the initiator 60 and the insert 80 may be assembled by, first, inserting the electrical contacts 76 into the orifice 84, within the first annular face 88. The initiator 60 may then be pressed into the insert 80 until the electrical contacts 76 pass through the second annular face 90 and the outer edge 74 of the initiator 60 abuts the orifice 84 of the insert 80. Then, the retention flaps 92 may be crimped or otherwise pressed inward toward the initiator 60, through a staking operation or the like.

The initiator 60 is then tightly engaged within the insert 80 and is unable to move in any direction. If desired, the orifice 84 may be sized to interfere slightly with the outer edge 74 of the initiator 60 to provide an interference fit between the initiator 60 and the insert 80. However, the use of the retention flaps 92 to lock the initiator 60 in place within the insert 80 makes an interference fit largely unnecessary.

The insert 80 may then, in turn, be installed within the housing 30. A press-fit, similar to that formed by the second end 34 of the housing 30 within the opening 36, may be utilized to seat the insert 80 into the smaller compartment 42. Thus, the bore 39, within the smaller compartment 42, may be tapered somewhat so that the bore 39 is somewhat larger toward the first end 32 of the housing 30. Similarly, the outer rim 82 of the insert 80 may be made somewhat narrower near the second annular face 90 than near the first annular face 88. The insert 80 may be installed by inserting the second annular face 90 into the smaller compartment 42, and pressing on the first annular face 88 until the second annular face 90 abuts the annular shelf 48 of the bore 39.

Preferably, the insert 80 has a material and geometry selected to provide a relatively high porosity, without reducing the compressive strength or ductility enough to cause cracking of the insert 80 during installation or operation of the insert 80 within the inflator 10. The compressive strength is necessary because of the radial pressure applied inwardly against the outer rim 82 of the insert 80 during installation of the insert 80 within the smaller compartment 42. Ductility is required for deformation of the retention flaps 92 to hold the initiator 60 in position within the insert 80. The porosity of the substantially porous mass 86 provides a unique flow path for gases escaping the cavity 58.

The insert 80 may be constructed in a variety of ways. One exemplary method of constructing the insert 80 is through compaction and sintering of a metal powder. More specifically, a metal, such as a ferrous material (iron or an iron alloy), may be atomized through a number of processes known in the art, such as directing a plasma spray against a solid expanse of the metal to remove small fragments, thereby forming a metallic powder. The metallic powder may then be compacted into a mold of the desired shape, at high pressure and ambient temperature, to create a compacted mass of the metallic powder. Compacting may be performed using a mold with a standard press arrangement, such as a 60 ton press.

The compacted mass then has the proper shape, but is quite brittle because the grains of powder have simply been pressed together without being bonded to each other in any way. Thus, the compacted mass has very little tensile strength. Consequently, the compacted mass may then be sintered, or baked, at high temperature and ambient pressure, for a certain amount of time in a special oven. The sintering process effectively fuses the grains together so that the newly-formed insert has tensile as well as compressive strength.

Preferably, the temperatures and pressures used during the compaction and sintering processes are selected to substantially maintain the grain structure of the powder, so that interstices remain present between the grains. Sintering at extremely elevated temperatures may melt the powder, thereby reordering the grain structure completely and eliminating the interstices. Sintering may, for example, be performed by baking the ferrous, compacted mass at about 1200° F. for about 45 minutes to 1 hour.

Generally, the inflator 10 may be relatively easily assembled. The pyrotechnic assembly 26 may be assembled by, first, installing the initiator 60 within the insert 80. The insert 80 may then be installed in the housing 30 through the first end 32 of the housing 30, in the manner described above. Then, the pressure dome 54 may be installed through the first end 32 of the housing 30 and fixed in place over the initiator 60. After installation of the pressure dome 54, the pyrotechnic material 50 may be added to fill the larger compartment 40 and surround the pressure dome 54. Then, the cap 52 may be positioned within the first end 32 of the housing 30, and staked into place.

After the pyrotechnic assembly 26 has been assembled it may be installed into the inflator 10. The inflator 10 may, for example, have a comparatively large opening (not shown) near the first end 18, through which the pyrotechnic assembly 26 can be inserted. The pyrotechnic assembly 26 may then be affixed at the second end 20 of the inflator 10 by seating the second end 34 of the housing 30 within the opening 36, as described above. The comparatively large opening may then be sealed off by installing a suitable cap or another pyrotechnic stage in the first end 18 of the inflator 10.

The inflator 10 may be filled with gas through a passageway 94, sealed through the use of a ball seal 96, and tested. One possible testing procedure according to the present invention will be described in detail below. After inflation and testing the inflator 10 may be installed in a vehicle in which a plug (not shown) may be permanently attached within the attachment portion 44 of the bore 39 in engagement with the electrical contacts 76.

The porous structure of the insert 80 makes the testing process for the inflator 10 simpler and more reliable. After the inflator 10 has been filled with the compressed gas, including a trace gas, if used, the inflator 10 may be checked for leaks through the use of a testing chamber (not shown) and gas detection equipment (not shown). More specifically, the inflator 10 may be placed within the chamber and the chamber may be substantially evacuated so that the ambient region 25 around the inflator 10 is at very low pressure. The inflator 10 may be left in the testing chamber for an established period of time, such as from about 15 to about 20 seconds.

While the inflator 10 is in the testing chamber residual gases may escape from the cavity 58 through the insert 80. Prior to insertion in the testing chamber the cavity 58 was at or near the pressure of the ambient region 25 so that the residual gases had no impetus to leave the cavity 58. However, due to the pressure differential induced by the vacuum within the testing chamber residual gases rapidly emerge. The porous structure of the insert 80 impedes the flow of these residual gases somewhat, so that they require several seconds to escape. However, the time required for the gases to leave the cavity 58 is substantially consistent because the porosity and geometry of the insert 80 are generally consistent from one insert 80 to the next. If an alternative flow path exists, for example, due to an irregularity in the outer rim 82 of the insert 80, the gas may escape more rapidly from the cavity 58 than predicted, but in any case, most of the gas will have escaped during the allotted time.

After the allotted time has passed, the testing chamber may be sealed so that gas cannot flow into or out of the chamber. The inflator 10 may be left in the sealed chamber for a second period of time, long enough to permit any gases leaking from the main internal compartment 22 to escape for detection. At this point, the residual gases from the cavity 58 has been substantially removed. Thus, most, if not all, of the residual gases from inflation of the inflator 10 have left the cavity 58. Thus, any substantial amount of the trace gas detected within the testing chamber after the testing chamber has been sealed originate not in the cavity 58, but in the main internal compartment 22 of the inflator 10. Thus, the compressed gas is leaking out of the inflator 10, and the inflator 10 must be scrapped or reworked.

Accordingly, the occurrence of virtual leaks and masked leaks is greatly reduced by the insert 80 of the present invention. Since the cavity 58 is evacuated through the insert 80 before the trace gas is detected, there is very little chance that gases from the cavity 58 will yield a false leak reading. Additionally, because gases escaping the main internal compartment 22 through the pressure dome 54 pass predictably through the insert 80, a leak in the pressure dome 54 will not be kept from detection by the insert 80.

Furthermore, through the unique flow path provided by the present invention, large amounts of gas are unable to move through the insert 80 during deployment of the inflator 10. Consequently, no effective blowby path exists for expanding gases to travel through the insert 80. Additionally, gases flowing through the insert 80 are not concentrated into any narrow pathway because the resistance to flow is relatively equal within all parts of the substantially porous mass 86 of the insert 80. As a result, no ballistic jets are able to form. Thus, through the apparatus and method presented by the present invention, inflators for automotive airbag systems can be made less expensive and more reliable, without compromising the safety of vehicle passengers.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflator for an airbag system, the inflator comprising:
    an outer wall having an opening;
    an initiator positioned proximate the opening for activation from outside the inflator;
    a pressure dome positioned inside the inflator to form a cavity containing the initiator; and
    an insert positioned around the initiator, the insert having a structure selected to permit passage of gas through the insert at a limited flow rate.

2. The inflator of claim 1, further comprising a housing for a pyrotechnic assembly, wherein the housing is affixed within the opening and positioned substantially within the inflator, the housing comprising a bore containing the initiator, the pressure dome, the insert, and a pyrotechnic material.

3. The inflator of claim 2, further comprising a cap positioned to keep the pyrotechnic material within the housing, the cap being maintained within the bore of the housing by a plurality of inward-protruding shelves formed in the housing through a staking operation.

4. The inflator of claim 2, wherein the pressure dome is configured to keep gases from a main internal compartment of the inflator from entering the cavity.

5. The inflator of claim 2, wherein the insert comprises an annular shape configured to engage the bore and an outer rim of the initiator.

6. The inflator of claim 1, wherein the structure is substantially porous.

7. The inflator of claim 6, wherein the insert comprises a metallic material.

8. The inflator of claim 6, wherein the structure is formed by compacting a powder to form a compacted mass having a desired shape and sintering the compacted mass.

9. An inflator for an airbag system, the inflator comprising:

an outer wall comprising an opening;

a membrane positioned to form a cavity within the inflator adjacent to the opening; and a substantially porous insert positioned proximate the opening to allow a limited flow of gas to pass through the opening prior to deployment of the inflator.

10. The inflator of claim 9, wherein the substantially porous insert comprises an orifice, sized to engage a penetrating member extending from the cavity to an ambient region of the inflator.

11. The inflator of claim 10, wherein the penetrating member comprises an initiator configured to ignite a pyrotechnic material proximate the opening.

12. The inflator of claim 9, wherein the substantially porous insert is formed by sintering.

13. The inflator of claim 9, further comprising a pyrotechnic assembly configured to retain the membrane, the substantially porous insert, and a pyrotechnic material.

14. A method for limiting passage of gas through an opening of an inflator, the method comprising:

providing a membrane;

providing an insert having a gas-permeability selected to permit passage of gas through the insert at a controlled flow rate;

installing the membrane to create a cavity within the inflator, the cavity being in fluid communication with the opening prior to deployment of the inflator; and installing the insert to control gas flow Out of the cavity through the opening.

15. The method of claim 14, wherein providing the insert comprises forming the insert with a substantially porous structure.

16. The method of claim 14, further comprising:

providing a housing for a pyrotechnic assembly, the housing comprising a bore;

providing a pyrotechnic material; and providing an initiator configured to ignite the pyrotechnic material.

17. The method of claim 16, further comprising:

providing a cap dimensioned to fit within the bore of the housing;

inserting the pyrotechnic material into the bore;

inserting the cap into the bore to hold the pyrotechnic material in place; and staking the housing to hold the cap in place.

18. The method of claim 16, wherein installing the insert in the opening comprises:

engaging the initiator within the insert; and engaging the insert within the bore.

19. The method of claim 14, wherein installing the membrane comprises substantially sealing the cavity from gas flow from a main internal compartment of the inflator.

* * * * *